United States Patent [19]

Ortiz

[11] 4,179,155
[45] Dec. 18, 1979

[54] LIGHT SHADE MOUNTABLE IN A PLURALITY OF POSITIONS ON A PLURALITY OF ITEMS IN AN AUTOMOBILE

[76] Inventor: Jose E. Ortiz, 6422 Virginia Hills Ave., Alexandria, Va. 22310

[21] Appl. No.: 925,861

[22] Filed: Jul. 18, 1978

[51] Int. Cl.² ............................................. B60J 3/02
[52] U.S. Cl. .......................... 296/97 C; 160/DIG. 3; 296/97 G
[58] Field of Search .................. 296/97 R, 97 G, 143, 296/97 C, 97 H, 97 J, 97 K; 160/DIG. 3

[56] References Cited

U.S. PATENT DOCUMENTS

| | | | |
|---|---|---|---|
| 2,747,927 | 5/1956 | Burkhead | 296/97 G |
| 3,363,666 | 1/1968 | Hodgson et al. | 296/97 G X |

*Primary Examiner*—Joseph F. Peters, Jr.
*Assistant Examiner*—Michael Mar
*Attorney, Agent, or Firm*—Laurence R. Brown

[57] ABSTRACT

The present invention relates to a roll-up light shade which is mountable in a plurality of positions on a plurality of items inside an automobile such as on a sun visor and a side windowpane movable between an up position and a down position. An articulated reversible mounting bracket is provided for mounting the shade in a right side up position and a reverse upside down position. A flexible light modifying screen is wound about a storage member which is rotatably supported by the frame of the light shade and when the light shade is positioned in the reverse upside down position on the windowpane in the up position the unwound portion of screen is supported by a support member above the uppermost portion of the window opening so that there is no uncovered gap at the uppermost portion and the driver is fully protected from the sun's rays.

9 Claims, 4 Drawing Figures

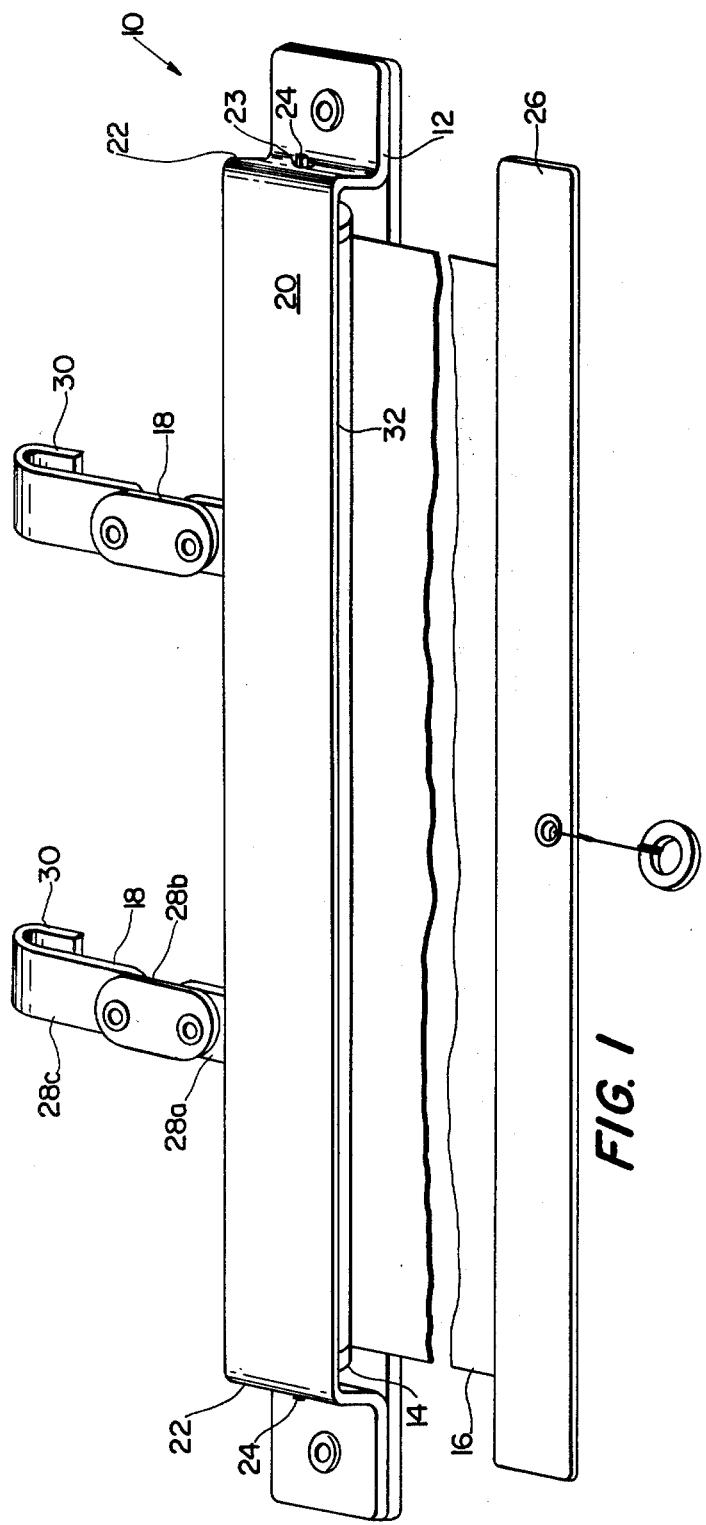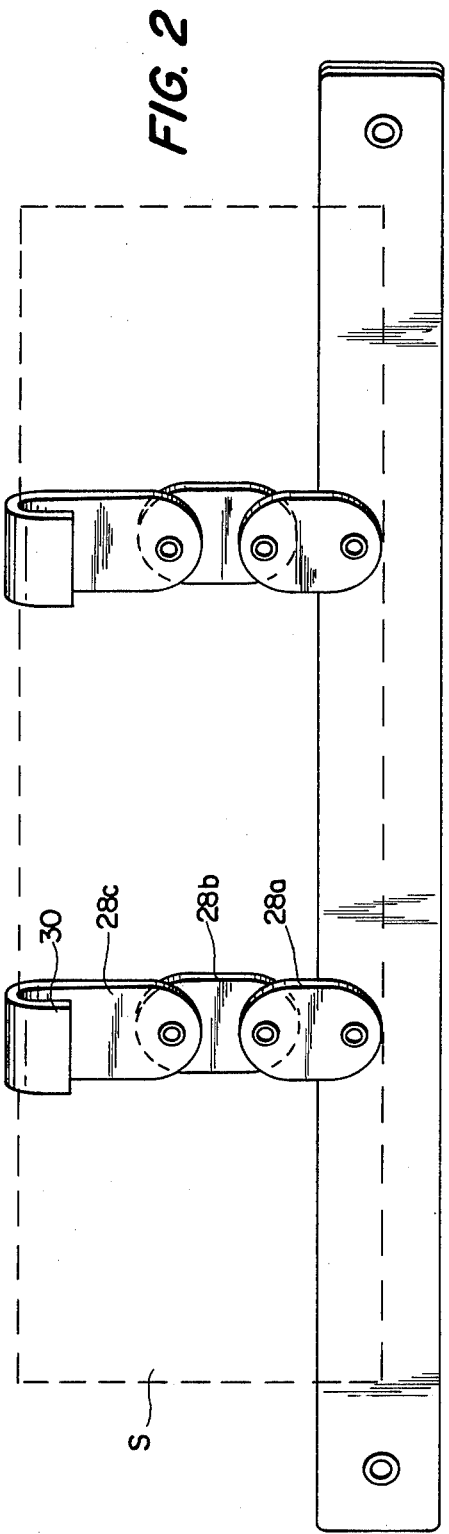

LIGHT SHADE MOUNTABLE IN A PLURALITY OF POSITIONS ON A PLURALITY OF ITEMS IN AN AUTOMOBILE

The present invention relates to an automobile accessory and, more particularly, to a light shade which is mountable in a plurality of positions on a plurality of items inside an automobile such as on a sun visor and a side windowpane.

The prior art is replete with sunshades for mounting in an automobile. One difficulty with the prior art window shades is that the rolled up shade is mounted below the uppermost part of the window and when the screen of the shade is unrolled, the screen extends downward and does not cover the uppermost part of the window forming an upper gap. As a result when the shade is used on a side window, particularly by truckers traveling long distances over an extended period of time during the day, the sun's rays passing through the unprotected and uncovered gap can cause a severe local sunburn. Accordingly, it is desirable to provide a roll-up sun shade mountable on a side windowpane of an automobile which covers the uppermost portion of the window opening. Accordingly, it is further desirable to provide reversible mounting on ears to permit the shade to be mounted upside down as well as right side up so that the screen can be unrolled and extended upwardly.

The prior art is also replete with sunshades which enlarge the protected area of a sun visor of an automobile. These sunshades clip onto the upper edge and hang downward past the lower edge of the sun visor. The screen material of the shade must attentuate or modify the light but also must be sufficiently transparent so as not to impede the driver's visibiliy, and should have dimensional and optical qualities which are stable with the passage of time and will not deteriorate with continued exposure to light and being subjected to temperature extremes such as a desert summer or a northern midwest winter. The most satisfactory stable screen material currently available is a tinted mylar or similar polyester based material. However, such material is relatively expensive compared to other available materials. Accordingly, it is desirable that the minimum quantity of material be used. When such a sunshade is used on a sun visor and supported at the top edge thereof, a substantial amount of screen material covers the sun visor itself and is not usable. Accordingly, it is desirable to provide a light shade having reduced screen material.

It is further desirable that the mounting means be expandable so that when the shade is secured and hung from the upper edge of the sun visor, the screen can start at approximately the lower edge of the sun visor thereby saving substantial screen material.

Accordingly, it is an object of the present invention to provide a solution to the above stated problems.

Another object of the present invention is to provide a light shade which when mounted on a side windowpane of an automobile does not leave an upper unprotected and uncovered gap through which the sun's rays can shine.

A further object of the present invention is to provide a light shade which can be mounted in a plurality of positions on a plurality of items inside an automobile.

A still further object is to provide a mounting means enabling the light shade to be mounted in right side up and upside down positions.

Yet another object is to provide an expandable mounting means for a light shade.

Yet another object is to reduce the area of protective screen necessary for use with a sun visor.

Further objects and advantages of the present invention will become apparent as the following description proceeds and the features of novelty characterizing the invention will be pointed out with particularity in the claims annexed to and forming a part of this specification.

Briefly, the present invention relates to a roll-up light shade having a flexible light attenuating screen wound about a cylindrical storage member which in turn is rotatably supported by a frame. The frame is supportable from an external support member by an articulated support bracket pivotally secured to the frame. The bracket enables the light shade to be mounted in a right side up position with the screen unwinding downwardly and in an upside down position with the screen unwinding upwardly from the storage member. When the light shade is mounted in the upside down position on a side windowpane in an up position, an elongated screen supporting member secured to the frame positionally supports a portion of the unwound screen at a point above the uppermost portion of the window opening so that there is no uncovered gap at the uppermost portion and the driver of the automobile is protected from the sun's rays. The light shade is also mountable on a sun visor in a right side up position with the articulated bracket mounted at the top of the sun visor with the bracket being expanded to lower the screen well below the top of the sun visor so that the top of the screen is at least slightly above the bottom of the sun visor thereby conserving screen material. The bracket comprises a plurality of arms pivotally connected in seriatum with the first arm pivotally connected to the frame and the last arm having a hook integrally formed therefrom.

For a better understanding of the present invention reference may be had to the accompanying drawings wherein the same reference numerals have been applied to like parts and wherein:

FIG. 1 is a front isometric view of the light shade of the present invention;

FIG. 2 is a rear view of the upper portion of FIG. 1 showing the light shade of the present invention mounted on a sun visor shown in phantom;

Figure 4:
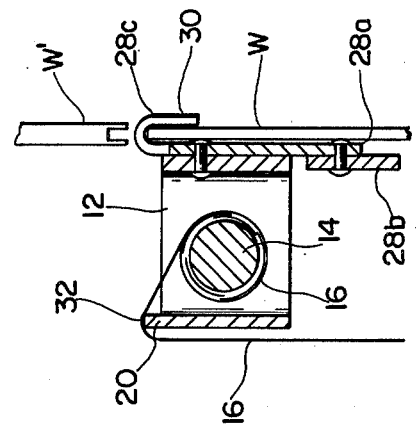
FIG. 4 is a cross sectional view taken approximately along line 4—4 of FIG. 3.

Referring now to the drawings, FIG. 1 shows a light shade generally designated 10, having a frame 12, a storage member 14 rotatably mounted to the frame 12, a flexible light attenuating or modifying screen 16 wound upon the circumference of the storage member 14, and an articulated bracket 18 pivotally connected to the frame 12 for securing the light shade to an external support and enabling the light shade to be mounted in a right side up position and in an upside down position. A screen support member 20 is secured to the frame 12 and supports a portion of the screen at a point above the uppermost portion of a window opening when the light shade is mounted in an upside down position (FIG. 4).

More particularly, referring to FIGS. 1 and 2, the light shade 10 is adapted to be clipped or hung on a sun visor or the like. The frame 12 is formed from sheet metal but can be made of any suitable material, and is provided with a pair of spaced apart flanges 22 each having an aperture 23 for receiving therein supporting fingers 24 of the storage member 14 for support thereof. The fingers 24 and the apertures 23 can be elongated so that the fingers do not rotate within the respective aperture 23 and the storage member 14 is provided with an appropriate spring return mechanism well known for use with window shades for rotation and return of the member 14.

The screen 16 is made from a flexible tinted mylar, polyester, or other appropriate film material and is provided with a tinting for attenuating or modifying the sun's rays. Other type films can be used but the film should be dimensionally and optically stable with time and with the temperature extremes which the automobile can be exposed. Polyester has been found to be the most suitable material though it is much more expensive than the substitute materials. The tint of the screen 16 should be of the proper color and density to attentuate or otherwise modify the rays of the sun passing therethrough.

The screen 16 is secured to the storage member 14 by appropriate means and is unwindable therefrom to cover a window or the like. A bar 26 is secured to the free end of the screen 16 for attachment thereto of a string, line, hook or the like 27 to enable the screen 16 to be pulled for winding and unwinding onto the storage member 14.

The articulate bracket 18 is formed from three arms 28a, b and c pivotally connected together in seriatum with the arm 28a pivotally connected to the frame 12. All the pivotal connections can be made by rivets or other appropriate means through apertures disposed at the ends of the arms and pivotally connecting the end portion of the respective arm to the end portion of an adjacent arm. The arm 28c is bent out of the plane thereof away from the frame 12 to form a hook 30 for securement to the upper edge of a sun visor S as shown in FIG. 2.

The bracket 18 as shown in FIG. 2 is in an extended position and lowers the frame 12 in proximity to the bottom of the sun visor S so that when the screen 16 is extended below visors the screen does not cover most of the sun visor which would require a substantially greater screen area thereby increasing the amount of the high cost screen material used.

Figure 3:
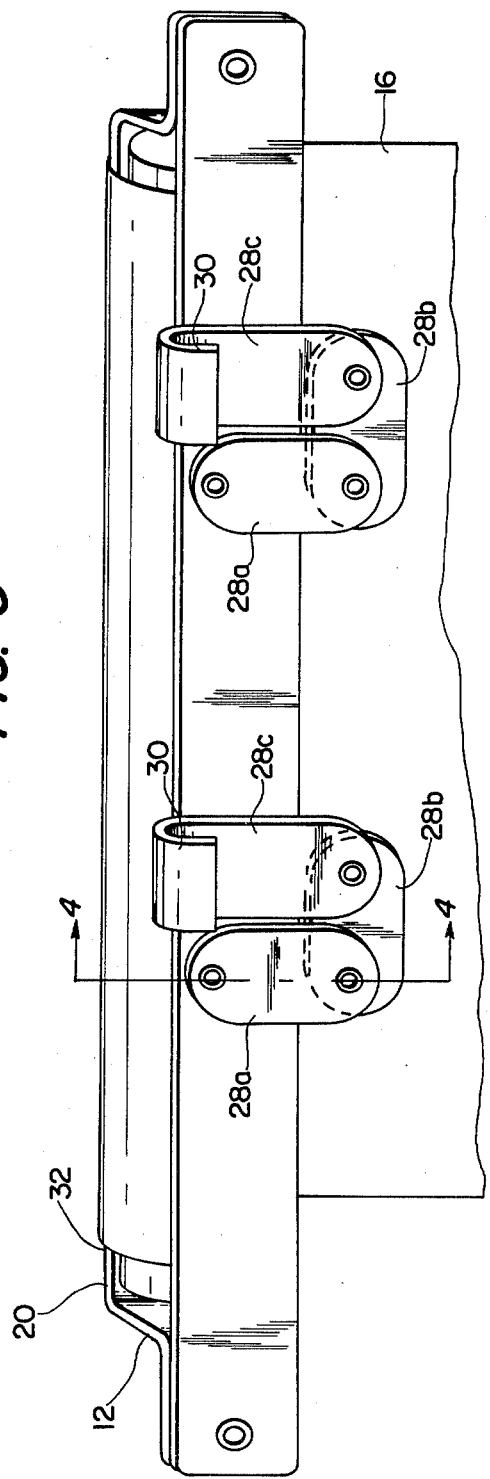
FIG. 3 is a rear view showing the light shade of FIG. 1 in a reverse upside down position.

The position of the arms of the articulated bracket 18 can be modified to that shown in FIGS. 3 and 4 where the positional orientation of the hook 30 is reversed 180 degrees so that the light shade 10 is mounted in a reverse upside down position. In this position, the effective length of the bracket 18 is reduced. In FIG. 1, the screen 16 unwinds from the storage member 14 downwardly, however, in the reverse upside down mounting of a windowpane W as shown in FIGS. 3 and 4, the screen 16 unwinds upwardly. In this position, the screen extends over a supporting edge 32 of the screen support member 20 and then hangs and extends downwardly over the screen mounting member 20 to cover the lower portion of the windowpane W.

The hook 30 is disposed at the uppermost edge of the windowpane W which is movable between an up and a down position and is shown in an up position. The hook 30 is securingly compressed between the upper edge of the window W and the top edge of the window opening W'. As previously stated, a common problem with prior art light shades is that when mounted on a windowpane, the screen unwinds downwardly and there is an uncovered gap between the screen and the top edge of the window opening. In the light shade of the present invention, when the light shade is mounted in the upside down position, the screen unwinds upwardly (FIG. 4) and is supported above the top edge of the window opening by the screen supporting member 20 at the supporting edge 32 which is disposed above the level of the top edge of the window opening when the windowpane is in an up position. The screen 16 extends over the supporting member 20 and hangs therefrom continuing downwardly to cover the rest of the window. In this manner the uppermost portion of the window opening is covered by the screen 16 and the driver is fully protected from the sun's rays.

While there has been illustrated and described what is at present considered to be a preferred embodiment of the present invention, it will be appreciated that numerous changes and modifications are likely to occur to those skilled in the art and it is intended in the appended claims to cover all those changes and modifications which fall within the true spirit and scope of the present invention.

What is claimed as new and desired to be secured by Letters Patent of the United States is:

1. A light shade mountable in a plurality of positions on a plurality of items inside an automobile such as on a sun visor or on a side windowpane of a wide window opening and having a reversible mounting means with an extended first position for attachment to the top edge of the sun visor when said visor is in a downward position and a reverse, upside down position wherein said mounting means is shortened for attachment to the upper edge of the windowpane, and means so that when mounted to said windowpane with the windowpane in the up position the uppermost portion of the window opening is coverable, said light shade comprising a frame, a storage member having a circumference and rotatably supported by the frame, a flexible light attenuating screen wound about the circumference of said storage member, and a screen supporting member supported by at least one of the mounting means and the frame and disposed so that when the lightshade is mounted in the reverse upside down position on the windowpane and the windowpane is in an up position with said supporting member extending above the uppermost portion of the window opening and when the screen is unwound from about said storage member, said screen extends over and is supported by said screen supporting member and hangs downward therefrom covering at least the uppermost portion of the window opening thereby to modify incoming sun's rays reaching the driver by holding said screen interposed between the driver and a glass surface of the automobile without an uncovered gap in the uppermost portion of the window opening to protect the driver from the sun's rays whether the shade is mounted on the visor in said first position or on a side window in said reverse upside down position and whereby a short length of the screen member is almost completely disposed over the window area in either position.

2. The device of claim 1 wherein said screen supporting member comprises an elongated bar and is disposed distal of the windowpane.

3. The device of claim 2 wherein the storage member rotates about an axis of rotation and the screen supporting member has a length greater than the length of the portion of the axis of rotation enclosed by the screen.

4. The device of claim 1 wherein the reversible mounting means comprises a plurality of arms including a last arm pivotably connected to seriatum to the frame and securement means disposed on the last arm from the frame for securement of the light shade to an external support.

5. The device of claim 4 wherein the arms comprise at least a first, second and third arm, each arm having a first and second end, the first end of the first arm being pivotably connected to the frame and the first end of each of the other arms being pivotably connected to the second end of the respective adjacent arm.

6. The device of claim 5 wherein the second arm has a first side and abuttingly and slidably engages the first arm and the third arm at the first side.

7. The device of claim 6 wherein the first arm is provided with a second side and abuttingly and slidably engages the frame and the second arm at the second side.

8. The device of claim 4 wherein the securement means is a hook.

9. The device of claim 8 wherein the hook is integral with the last arm, the last arm is generally planar, and the hook is bent out of the plane of the last arm in a direction away from the frame.

* * * * *